Patented Nov. 22, 1927.

1,650,133

UNITED STATES PATENT OFFICE.

HERBERT O. KEAY, OF GRAND'MERE, QUEBEC, CANADA, ASSIGNOR TO LAURENTIDE COMPANY LIMITED, OF GRAND'MERE, QUEBEC, CANADA.

ABRASIVE CEMENT.

No Drawing.     Application filed August 11, 1925.     Serial No. 49,649.

This invention relates to the production of a suitable cementing material for binding or cementing sandstones together, in order to form a grinding stone of suitable diameter and face width.

In obtaining pulp grinding stones from sandstone quarries, considerable difficulty is experienced in obtaining sufficient masses of clear sandstone material, free from defects, from which to turn out finished stones suitable for grinding logs, such stones having, say, a finished diameter of sixty-two inches, with a face width of fifty-four inches.

The principal object of this invention is to produce pulp grinding stones, and the like, of suitable face width, from smaller stones cemented together and in which the cementing material will not crumble away in service, thus leaving a crack or opening in the face of the stone. A further object is to produce a cementing material for cementing surfaces of stones, which material will contain an abrasive aggregate adapted to perform its work in grinding as evenly as the sandstone itself, and which cementing material will be insoluble in hot water, will be strongly adhesive, will be sufficiently hard to re-inforce the edges of the stone so that the dressing burr will not crush off the edges, and also which will be sufficiently porous to prevent glazing at the grinding surface.

I have found that the above important properties may be obtained by using resin dissolved in an organic solvent as a binder for an abrasive aggregate. The resin which I find most suitable is a phenolic formaldehyde resin preferably such as set forth in British Patent No. 9,291 of 1914 to Laurence Vincent Redman. Resins of this character are formed by incorporating hexamethylenetetramine with a phenol and heating the mixture, the excess of either reagent being removed or left in the compound as desired. Resins of this character may be manufactured by mixing the ingredients in suitable proportions to form a product which can be converted into an insoluble infusible chemically inert substance. The preferred proportion is one and one-half phenol groups to one methylene group although it is obvious that this proportion may be somewhat varied. The best results have been obtained by using Resin No. 201 known under the name of "Redmanol" and manufactured by the Bakelite Corporation. However any similar artificial resin, capable of solution by an organic solvent, may be employed. In this connection, it may be noted that hexamethylenetetramine is the equivalent of formaldehyde. This abrasive cement consists of the following ingredients and is made up in the following manner; about 90 parts, by weight, of clean dry fine sand which will pass through a 28 mesh sieve and be retained on a 100 mesh sieve, are thoroughly mixed, dry, with 10 parts, by weight, of a phenolic formaldehyde resin, and to this mixture is added 3⅓ parts, by weight, of furfural mixed with 2½ parts, by weight, of an alcohol such as ethyl alcohol, the whole mass being throughly mixed and kneaded together until all of the grains of sand are completely wetted by the dissolved resin.

Before applying this abrasive cement to the surfaces to be cemented I find it preferable to apply to said surfaces a preliminary coating consisting of approximately 10 parts, by weight, of a phenolic formaldehyde resin and 3⅓ parts, by weight, of furfural mixed with 2½ parts, by weight, of denatured alcohol. The prepared surfaces may then be coated with about $\frac{1}{16}$ of an inch of the abrasive cement and when the cement between the parts is consolidated, by a slight reciprocating motion of one part on the other, the parts are clamped together and put into an oven and heated, gradually, to a maximum temperature of about 215° C. The time for bringing the temperature to maximum depends upon the size of the stones. For very large stones this period should extend for about four days. The cooling period should be slow and should occupy about the same time as the period of heating.

I have found that stones cemented together with this abrasive mixture will have all the grinding qualities of solid sandstone.

I have found that denatured grain alcohol gives satisfactory results and it may be used in place of the pure alcohol.

Having thus described my invention, what I claim is:—

An abrasive cement, consisting of fine sand approximately 90 parts, a phenolic formaldehyde resin approximately 10 parts, furfural approximately 3⅓ parts, and alcohol approximately 2½ parts, by weight, all thoroughly mixed and kneaded together into a cement paste.

In witness whereof, I have hereunto set my hand.

HERBERT O. KEAY.